(12) United States Patent
Hunt et al.

(10) Patent No.: US 11,649,067 B2
(45) Date of Patent: May 16, 2023

(54) OBJECT MONITORING SYSTEM FOR AIRCRAFT

(71) Applicant: The Boeing Company, Chicago, IL (US)

(72) Inventors: Jeffrey H. Hunt, Los Angeles, CA (US); Pamela L. Blake, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 16/899,864

(22) Filed: Jun. 12, 2020

(65) Prior Publication Data
US 2021/0390290 A1 Dec. 16, 2021

(51) Int. Cl.
| | |
|---|---|
| *G06V 40/10* | (2022.01) |
| *B64F 5/60* | (2017.01) |
| *B64D 45/00* | (2006.01) |
| *B64D 47/08* | (2006.01) |
| *G05B 13/02* | (2006.01) |
| *G06T 7/20* | (2017.01) |
| *G06V 20/00* | (2022.01) |

(52) U.S. Cl.
CPC ....... *G06V 40/103* (2022.01); *B64D 45/0053* (2019.08); *B64D 47/08* (2013.01); *B64F 5/60* (2017.01); *G05B 13/0265* (2013.01); *G06T 7/20* (2013.01); *G06V 20/00* (2022.01); *G06T 2207/10028* (2013.01); *G06T 2207/10048* (2013.01); *G06T 2207/10116* (2013.01); *G06T 2207/30112* (2013.01); *G06T 2207/30196* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 10,453,197 B1 * | 10/2019 | Cholakkal | G06K 9/4628 |
| 11,281,894 B2 * | 3/2022 | Miike | G06T 7/74 |
| 2005/0012614 A1 * | 1/2005 | Brosow | B64F 1/366 |
| | | | 340/572.1 |

(Continued)

FOREIGN PATENT DOCUMENTS

JP 2014186650 A * 10/2014

OTHER PUBLICATIONS

"People Counters," Traf-Sys, Accessed May 22, 2020, 10 pages, http://www.liafsys.com/people-counting/.

(Continued)

*Primary Examiner* — Delomia L Gilliard
(74) *Attorney, Agent, or Firm* — Yee & Associates, P.C.

(57) ABSTRACT

A method, apparatus, system, and computer program product for monitoring a platform. Images are received by a computer system from a sensor system positioned to monitor movement of human beings relative to the platform. A set of the human beings is identified by the computer system in the images. The movement of the set of the human beings relative to the platform is determined by the computer system using the images. A count of the human beings on the platform is determined by the computer system based on the movement determined for the set of the human beings. A set of actions is performed by the computer system based on the count of the human beings on the platform.

47 Claims, 6 Drawing Sheets

(56) References Cited

U.S. PATENT DOCUMENTS

| | | | |
|---|---|---|---|
| 2010/0060739 A1* | 3/2010 | Salazar | B64D 11/0624 |
| | | | 348/148 |
| 2010/0195634 A1* | 8/2010 | Thompson | H04W 36/385 |
| | | | 370/338 |
| 2016/0221687 A1* | 8/2016 | Boigas | H04N 5/247 |
| 2016/0224843 A1* | 8/2016 | Boigas | G06K 9/00255 |
| 2016/0247101 A1* | 8/2016 | Agrawal | G06K 9/00771 |
| 2017/0053169 A1* | 2/2017 | Cuban | B64C 39/024 |
| 2017/0068863 A1* | 3/2017 | Rattner | G06K 9/00838 |
| 2017/0113801 A1* | 4/2017 | Brunaux | B64D 47/08 |
| 2017/0283086 A1* | 10/2017 | Garing | B64D 11/0638 |
| 2018/0285648 A1 | 10/2018 | Pan et al. | |
| 2019/0050638 A1* | 2/2019 | Watanabe | G06T 7/20 |
| 2019/0112050 A1* | 4/2019 | Ibrahim | G06N 20/00 |
| 2019/0251376 A1* | 8/2019 | Stoffel | H04W 4/44 |
| 2019/0377959 A1* | 12/2019 | Marano | G06Q 50/30 |

OTHER PUBLICATIONS

"Real-time wireless bidirectional people counter SensMax Pro D3 LongRange TS," SensMax, Accessed May 26, 2020, 4 pages, http://sensmax.eu/devices/real-time-wireless-bidirectional-people-counter-sensmax-pro-d3-longrange-ts/.

Nguyen et al., "Comparison of 3 Infrared Thermal Detection Systems and Self-Report for Mass Fever Screening," Emerging Infectious Diseases, Nov. 2010, vol. 16, No. 11, pp. 1710-1717.

Extended European Search Report dated Nov. 8, 2021 regarding EP Applicatin No. 21178883.1; 10 pages.

\* cited by examiner

OBJECT MONITORING SYSTEM FOR AIRCRAFT

BACKGROUND INFORMATION

1. Field

The present disclosure relates generally to aircraft and, in particular, to a method, apparatus, system, and computer program product for monitoring an ingress of objects into an aircraft and an egress of objects out of the aircraft.

2. Background

The flight of an aircraft involves an embarkation process in which passengers enter the aircraft. During this process, boarding passes are checked at a boarding door in an airport to make sure that passengers are boarding the correct flight. Prior to the flight, airline personnel count the passengers onboard the aircraft to determine how many passengers are present in the aircraft. This count can be compared to the number of boarding passes used to check-in the passengers for the flight.

Disembarkation occurs after the flight reaches the gate at the destination airport. During the disembarkation, the passengers leave the aircraft carrying their luggage and other items. Prior to cabin crew departing the aircraft, the cabin crew perform a check of the aircraft to ensure that all passengers and their items have been removed from the aircraft. For example, the cabin crew will look up and down the cabin and check overhead bins as they leave the aircraft looking for passengers or any items that the passengers may have left behind.

A further check occurs when a cleaning crew cleans the aircraft between flights or after the last flight. This cleaning can identify items that may have been left behind by the passengers. These processes are labor-intensive and subject to errors in which the passengers, their items, or both may unexpectedly remain on the aircraft and go unnoticed by the different checks.

Therefore, it would be desirable to have a method and apparatus that take into account at least some of the issues discussed above, as well as other possible issues. For example, it would be desirable to have a method and apparatus that overcome a technical problem with tracking passengers and objects that enter and leave an aircraft.

SUMMARY

An embodiment of the present disclosure provides a method for monitoring traffic for an aircraft. Images are received by a computer system from a sensor system positioned to monitor movement of human beings relative to an aircraft. A set of the human beings is identified in the images by the computer system. The movement of the set of the human beings relative to the aircraft is determined by the computer system using the images. A count of the human beings in the aircraft is determined by the computer system based on the movement determined for the set of the human beings. A set of actions is performed by the computer system based on the count of the human beings in the aircraft.

Another embodiment of the present disclosure provides a method for monitoring a platform. Images are received by a computer system from a sensor system positioned to monitor movement of human beings relative to the platform. A set of the human beings is identified by the computer system in the images. The movement of the set of the human beings relative to the platform is determined by the computer system using the images. A count of the human beings on the platform is determined by the computer system based on the movement determined for the set of the human beings. A set of actions is performed by the computer system based on the count of the human beings on the platform.

Still another embodiment of the present disclosure provides an aircraft monitoring system comprising a computer system and a controller in the computer system. The controller is configured to receive images from a sensor system positioned to monitor movement of human beings relative to an aircraft. The controller is configured to identify a set of the human beings in the images. The controller is configured to determine the movement of the set of the human beings relative to the aircraft using the images. The controller is configured to determine a count of the human beings in the aircraft based on the movement determined for the set of the human beings. The controller is configured to perform a set of actions based on the count of the human beings in the aircraft.

Yet another embodiment of the present disclosure provides a platform monitoring system comprising a computer system and a controller in the computer system. The controller is configured to receive images from a sensor system positioned to monitor movement of human beings relative to the platform. The controller is configured to identify a set of the human beings in the images. The controller is configured to determine the movement of the set of the human beings relative to the platform using the images. The controller is configured to determine a count of the human beings on the platform based on the movement determined for the set of the human beings. The controller is configured to perform a set of actions based on the count of the human beings on the platform.

Another embodiment of the present disclosure provides a computer program product for monitoring an aircraft, the computer program product comprising a computer-readable storage media with first program code, second program code, third program code, fourth program code, and fifth program code stored on the computer-readable storage media. The first program code is executable by a computer system to cause the computer system to receive images from a sensor system positioned to monitor movement of human beings relative to an aircraft. The second program code is executable by the computer system to cause the computer system to identify a set of the human beings in the images. The third program code is executable by the computer system to cause the computer system to determine the movement of the set of the human beings relative to the aircraft using the images. The fourth program code is executable by the computer system to cause the computer system to determine a count of the human beings in the aircraft based on the movement determined for the set of the human beings. The fifth program code is executable by the computer system to cause the computer system to perform a set of actions based on the count of the human beings in the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that having cabin crew and other personnel monitor entry and exit of passengers and their items can be difficult to perform consistently. For example, the illustrative embodiments recognize and take into account that a sleeping passenger, luggage, or other items left behind can be missed during checks performed by the cabin crew, maintenance personnel, and other personnel. The illustrative embodiments recognize and take into account that these types of inconsistencies can happen at the end of a multi-day set of flights by the cabin crew.

Thus, the illustrative embodiments provide a method, apparatus, system, and computer program product for monitoring traffic for an aircraft. In one illustrative example, a method monitors a platform such as an aircraft. Images are received by a computer system from a sensor system positioned to monitor movement of human beings relative to the aircraft. A set of the human beings is identified by the computer system in the images. The movement of the set of the human beings relative to the platform is determined by the computer system using the images. A count of the human beings on the aircraft is determined by the computer system based on the movement determined for the set of the human beings. A set of actions is performed by the computer system based on the count of the human beings on the platform.

In the illustrative example, a person may be on a platform by being inside of a compartment, a room, a skybridge, an office, a lobby, a cabin, an antechamber, an atrium, an attic, an auditorium, a cargo area, a passage, a hallway, or some other interior space for the platform. Additionally, a person may be on a platform by being on a deck, a balcony, or some other outside area for the platform.

Figure 1:
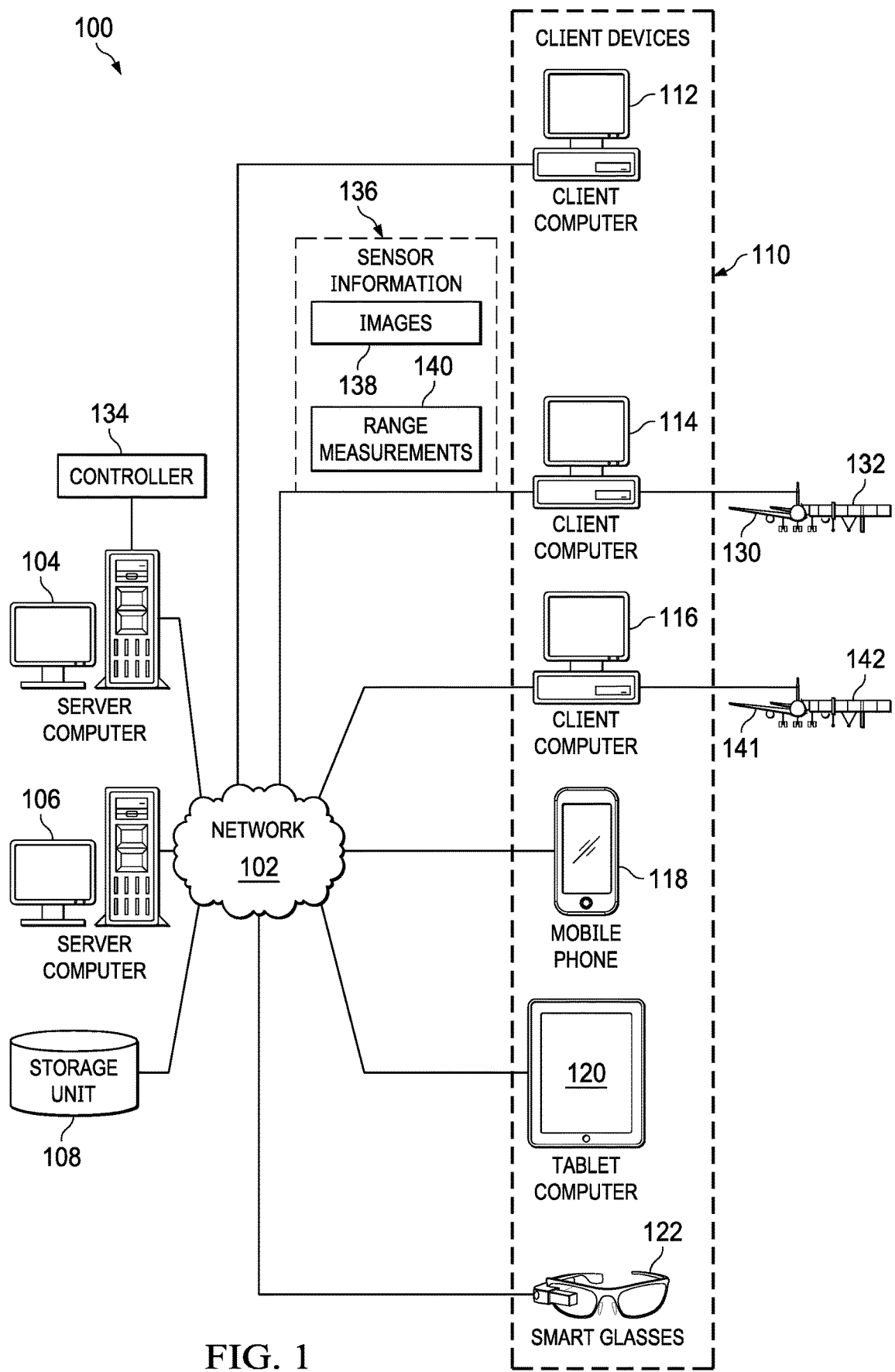
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, client computer 114 is in communication with a sensor system having sensors located in airplane 130 and passenger boarding bridge 132. In some illustrative examples, the sensors may be located in airplane 130 and not in passenger boarding bridge 132. Client computer 114 and the sensor system are part of an aircraft monitoring system. This aircraft monitoring system also includes controller 134 located in server computer 104. In this illustrative example, controller 134 operates to determine how many people are inside of airplane 130. This determination can be made at a number of different times. For example, the determination can be made prior to embarking, after embarking, prior to disembarking, after disembarking, prior to takeoff, after takeoff, or at other times or phases of flight.

Controller 134 receives sensor information 136 from client computer 114. In this illustrative example, sensor information 136 sent by client computer 114 is generated by sensors in the sensor system located in airplane 130 and passenger boarding bridge 132. As depicted, sensor information 136 includes images 138 that can be analyzed to determine how many people are located in airplane 130.

In this illustrative example, controller 134 can identify objects in images 138. Further, controller 134 also identify motion of the objects in images 138. Controller 134 can categorize the objects into object types based on the motion type identified for the objects. For example, the motion type may indicate that an object is a human being, an animal, a piece of luggage, a cart, a wheelchair, and some other type of object. Controller 134 can also analyze features for the objects in images 138 to classify the objects.

Further, controller 134 can also analyze other sensor information in addition or in place of images 138 to identify the object types. For example, sensor information 136 can also include range measurements 140. Range measurements 140 can be generated from a light detection and ranging (LiDAR) sensor using pulsed laser beams to measure ranges to the objects. These ranges can be used to identify dimensions of the objects, locations of the objects, movement of the objects, or other suitable information about the objects.

In this illustrative example, controller 134 can analyze images 138 and range measurements 140 to identify human beings who may be present in airplane 130 and passenger boarding bridge 132. In this illustrative example, images 138 can be analyzed to determine movement of the objects identified with respect to airplane 130. The movement of the objects identified and sensor information 136 can be used to determine where the objects are located, where the objects are moving, or whether the objects are inside of airplane 130, outside of airplane 130, in passenger boarding bridge 132, or some other determination of locations that can be used to monitor traffic for airplane 130. In this example, the traffic is the movement of the objects into and out of airplane 130.

Controller 134 can perform a set of actions based on having human beings present in airplane 130. As used herein, "a set of," when used with reference to items, means one or more items. For example, "a set of different types of networks" is one or more different types of networks.

For example, a number of the human beings present in airplane 130 can be determined when airplane 130 has finished embarking passengers and before pulling away from passenger boarding bridge 132. This count can be used to determine whether airplane 130 is ready to leave passenger boarding bridge 132. In this example, the set of actions can be at least one of indicating whether all of the passengers boarded airplane 130, indicating a number of passengers present in airplane 130, indicating a number of pieces of luggage present in airplane 130, or other suitable actions.

In this illustrative example, controller 134 can perform this monitoring for other airplanes and other passenger boarding bridges such as airplane 141 and passenger boarding bridge 142. In this illustrative example, airplane 130 and airplane 141 can be for the same airliner or different airlines. In another illustrative example, airplane 130 and airplane 141 can be at the same or different airports. In this manner, the traffic for airplanes can be performed for an airline, an entire airport, a plurality of airlines, a plurality of airports, or other suitable groupings of aircraft for which monitoring of traffic into and out of aircraft is desired.

Figure 2:
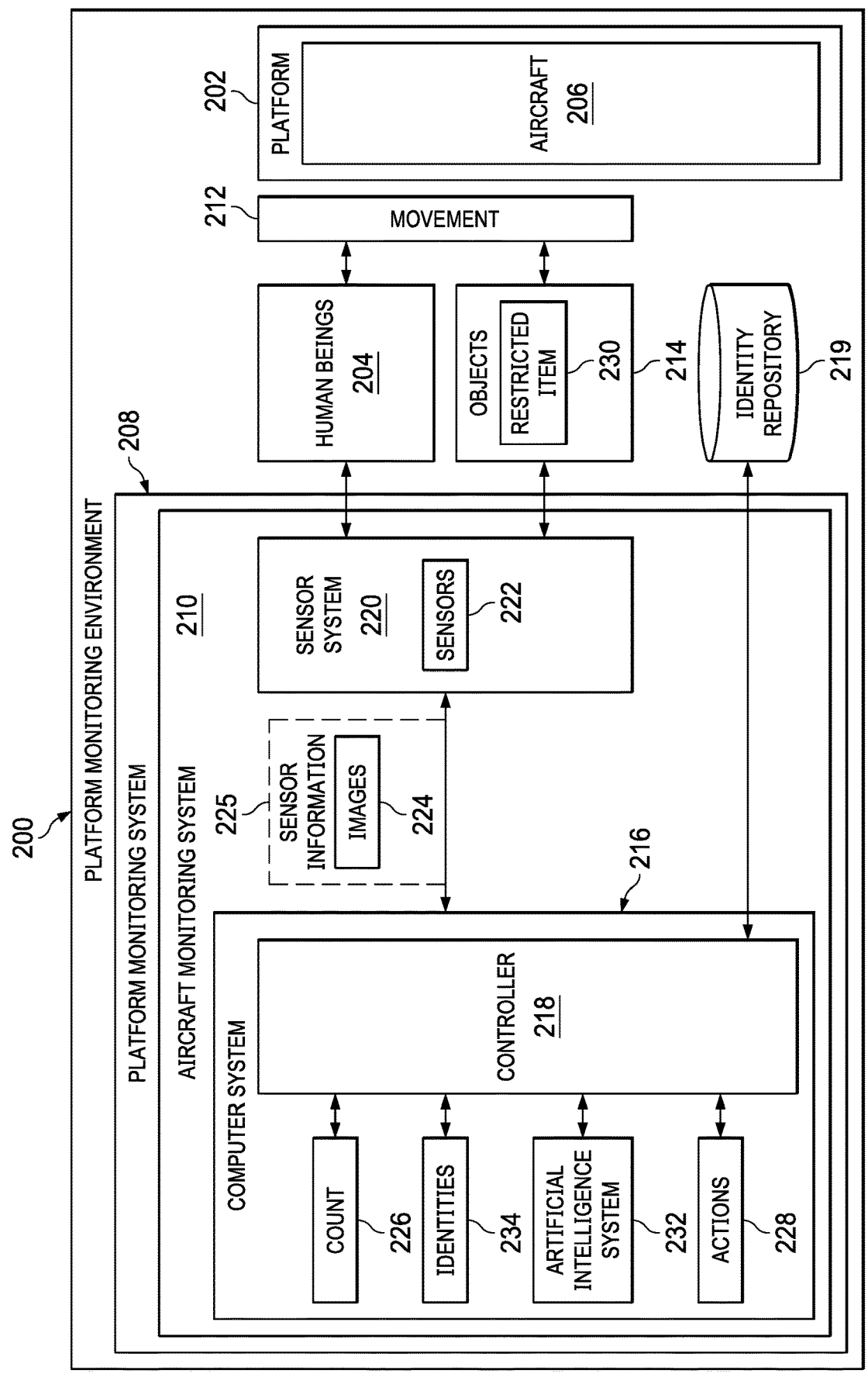
FIG. 2 is an illustration of a block diagram of a platform monitoring environment in accordance with an illustrative embodiment.

With reference now to FIG. 2, an illustration of a block diagram of a platform monitoring environment is depicted in accordance with an illustrative embodiment. In this illustrative example, platform monitoring environment 200 includes components that can be implemented using hardware such as the hardware shown in network data processing system 100 in FIG. 1.

In this illustrative example, platform monitoring environment 200 is an environment in which platform 202 can be monitored for human beings 204 relative to platform 202. In this illustrative example, platform 202 is aircraft 206. Aircraft 206 can be, for example, an airplane, a commercial aircraft, a commercial airplane, a rotorcraft, a tilt-rotor aircraft, a tilt-wing aircraft, a vertical takeoff and landing (VTOL) aircraft, or some other type of aircraft.

In this illustrative example, the monitoring of platform 202 can be performed by platform monitoring system 208. Platform monitoring system 208 takes the form of aircraft monitoring system 210 when platform 202 is aircraft 206.

In this illustrative example, aircraft monitoring system 210 can monitor traffic such as movement 212 of human beings 204 and objects 214 relative to aircraft 206. Objects 214 can be categorized into a number of different object types. For example, objects 214 are selected from at least one of a piece of luggage, a backpack, a rolling suitcase, a bag, a box, a bottle, a purse, a suitcase, a duffel bag, a wallet, a belt, an animal, or some other object type.

In this illustrative example, aircraft monitoring system 210 is comprised of a number of different components. As depicted, aircraft monitoring system 210 comprises computer system 216 and controller 218 in computer system 216.

Controller 218 can be implemented in software, hardware, firmware, or a combination thereof. When software is used, the operations performed by controller 218 can be implemented in program code configured to run on hardware, such as a processor unit. When firmware is used, the operations performed by controller 218 can be implemented in program code and data and stored in persistent memory to run on a processor unit. When hardware is employed, the hardware can include circuits that operate to perform the operations in controller 218.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 216 is a physical hardware system and includes one or more data processing systems. When more than one data processing system is present in computer system 216, those data processing systems are in communication with each other using a communications medium. The communications medium can be a network. The data processing systems can be selected from at least one of a computer, a server computer, a tablet computer, or some other suitable data processing system.

In this illustrative example, aircraft monitoring system 210 includes sensor system 220. Sensor system 220 is a hardware system and can also include software.

In some illustrative examples, sensor system 220 can be considered a separate component from aircraft monitoring system 210. When used to monitor other types of platforms, these components can be used to perform the operations described in this figure to monitor aircraft 206. Sensor system 220 can be comprised of sensors 222 selected from at least one of a visible light camera, an infrared (IR) sensor, a panchromatic camera, a terahertz camera, an x-ray system, a thermal infrared (IR) sensor, a light detection and ranging (LiDAR) system, or other suitable type of sensor devices.

In this illustrative example, sensors 222 in sensor system 220 can be positioned relative to aircraft 206 to monitor movement 212 of at least one of human beings 204 or objects 214 relative to aircraft 206. For example, sensors 222 can be located in at least one of a passenger cabin, an aircraft doorway, a bulkhead, a sidewall of the aircraft, a jetway, a floor of the aircraft, a galley, a lavatory, a passenger comfort unit, a passenger boarding bridge doorway, a cargo hold, a gate at an airport, a jet bridge, a passenger boarding bridge, or some other suitable location.

In this illustrative example, controller 218 is configured to perform a number of different operations. For example, controller 218 can receive images 224 in sensor information 225 received from sensors 222 in sensor system 220. In this illustrative example, sensors 222 and sensor system 220 are positioned to monitor movement 212 of human beings 204 relative to aircraft 206. Controller 218 can identify a set of human beings 204 in images 224.

Further, controller 218 can determine movement 212 of the set of human beings 204 relative to aircraft 206 using images 224. Controller 218 can determine count 226 of human beings 204 in aircraft 206 based on movement 212 determined for the set of human beings 204. For example, controller 218 can track movement 212 of at least one of human beings 204 or objects 214 into and out of aircraft 206 to determine count 226 for at least one of human beings 204 or objects 214 in aircraft 206.

In this illustrative example, the determination of count 226 of human beings 204 in aircraft 206 based on movement 212 determined for the set of human beings 204 can be performed in response to one or more events. An event can be a periodic event or a nonperiodic event. For example, with the periodic event, this determination can be made every ten minutes, every five minutes, or after some other suitable period of time.

In another illustrative example, this determination can be performed to determine how many of human beings 204 are in aircraft 206 after the nonperiodic event occurs. The nonperiodic event can be selected from at least one of boarding the aircraft, deplaning the aircraft, closing an aircraft door after deplaning, leaving a departure gate, performing a partial deboarding of the aircraft, taking off, landing, or some other nonperiodic event.

Controller 218 can perform a set of actions 228 based on count 226 of human beings 204 in aircraft 206. In the illustrative example, the set of actions 228 can be selected from at least one of sending a message, generating an alert, creating a log entry with a set of human beings 204, indicating ready for departure, indicating not ready for departure, indicating a missing passenger, indicating a presence of a passenger in the aircraft, indicating the presence of an object or an animal left behind by a passenger, indicating a passenger is present on aircraft 206 inconsistent with a passenger log for aircraft 206 (including during lay-overs when passengers who should have disembarked did not), indicating the presence of an unidentified object on aircraft 206, determining whether a human being is restricted from flying on aircraft 206, indicating the presence of an animal in aircraft 206, indicating when a number of pieces of luggage exceed a storage capacity of an overhead bin and under-seat storage in the passenger cabin, alerting a pilot, alerting a flight attendant, alerting a gate attendant, preventing an aircraft engine start, preventing closing of an aircraft door for aircraft 206, indicating an object left behind in a cargo hold by aircraft personnel, performing a cross-check of a passenger count during an emergency egress of aircraft 206, or other suitable actions.

In the illustrative example, controller 218 can also identify a set of objects 214 associated with the set of human beings 204 using images 224. Controller 218 can determine how many of objects 214 are in aircraft 206 based on movement 212 determined for the set of objects 214. This set of objects 214 identified can be part of count 226. In other words, count 226 can be how many of human beings 204, how many of objects 214, or how many of both are present in aircraft 206. In this example, objects 214 can include animals. This determination can also be made in response to a periodic event or a nonperiodic event such as those described for human beings 204.

Additionally, count 226 of human beings 204, objects 214, or both can be used to perform various actions in actions 228. For example, objects 214 can be analyzed to identify objects that have a size corresponding to items requiring them to be stored in overhead bins or under-seat storage. The number of these types of objects can be used to determine whether the number of objects present exceeds the storage capacity for those items in the passenger cabin of aircraft 206.

In other words, a determination can be made as to whether the pieces of luggage, purses, backpacks, and other items exceed the storage capacity of the overhead bins and the under-seat storage in the passenger cabin. If the number of pieces of items that are required to be stored exceeds the storage capacity in the passenger cabin, actions 228, such as placing one or more items in the cargo area, can be performed to ensure that the remaining items can be properly stored within the passenger cabin.

In addition to identifying a set of objects 214 associated with the set of human beings 204, controller 218 can also determine whether restricted item 230 is present in the set of objects 214. In the illustrative example, restricted item 230 can be located in an object in the set of objects 214 or can be an object in the set of objects 214.

In this illustrative example, the identification of restricted item 230 can be performed by controller 218 analyzing a group of images 224. The group of images 224 can be images generated by sensors 222 such as at least one of a panchromatic camera, a terahertz camera, a millimeter wave scanner, an infrared (IR) camera, an x-ray system, or some other suitable type of sensor.

With the identification of objects 214, controller 218 can perform the set of actions 228 based on movement 212 determined for at least one of the set of human beings 204 or the set of objects 214.

At least one of the identification of human beings 204, objects 214, count 226 of human beings 204, or count 226 of objects 214 using images 224 can be performed by controller 218 using artificial intelligence system 232.

As depicted, artificial intelligence system 232 is a system that has intelligent behavior and can be based on the function of a human brain. Artificial intelligence system 232 comprises at least one of an artificial neural network, a cognitive system, a Bayesian network, a fuzzy logic, an expert system, a natural language system, or some other suitable system. Machine learning is used to train artificial intelligence system 232. Machine learning involves inputting data into the process and allowing the process to adjust and improve the function of artificial intelligence system 232. These components may form one or more machine learning models in artificial intelligence system 232.

A machine learning model is a type of artificial intelligence model in artificial intelligence system 232 that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

Additionally, controller 218 can determine a set of identities 234 for the set of human beings 204 in images 224 based on at least one of a type of motion identified for objects 214 in images 224, object features, template comparison, or other suitable techniques for determining identities 234 for the set of human beings 204. As depicted, controller 218 can make this determination using artificial intelligence system 232.

For example, in determining the set of identities 234 for the set of human beings 204, controller 218 can determine whether the set of human beings 204 is comprised of passengers, cabin crew, or other people who should be present to allow aircraft 206 to leave the passenger boarding bridge for takeoff. For example, controller 218 can identify the passengers in the set of human beings 204.

Controller 218 can also determine who the passengers are from images 224 using facial recognition techniques implemented in artificial intelligence system 232. This process can be used to perform an additional verification of the passengers who use boarding passes or checked in for a particular flight of aircraft 206. As a result, additional redundancy can be present for verifying the passengers for a flight.

Additionally, with the identification of human beings 204, controller 218 can determine whether human beings 204 identified in aircraft 206 are on a restricted list. Further, this determination can also be made for human beings 204 identified moving outside of aircraft 206 in addition to human beings 204 in aircraft 206.

In the illustrative example, controller 218 can access identity repository 219. Identity repository 219 can be one or more collections of information such as databases. Identity repository 219 can include lists or identifications of human beings 204 that may be restricted with respect to being present or flying in aircraft 206. For example, identity repository 219 may identify human beings 204 who may be restricted from flying, entering countries, or other types of restrictions. For example, identity repository 219 can include a terrorist screening database (TSDB) or other watch lists. In this manner, controller 218 in aircraft monitoring system 210 can operate to provide additional security in addition to the checks and screenings performed within an airport.

In one illustrative example, one or more technical solutions are present that overcome a technical problem with monitoring traffic in which passengers and objects enter and exit an aircraft. As a result, one or more technical solutions can provide a technical effect of monitoring traffic such as the movement of human beings to determine how many human beings are present in the aircraft. One or more technical solutions can monitor the movement of human beings 204 into and out of aircraft 206 in a manner that enables counting how many human beings 204 are present in aircraft 206.

This process in the illustrative example can be used to monitor an ingress and egress of passengers and objects associated with the passengers to ensure that all of the passengers and their objects that boarded the aircraft have left the aircraft after a flight. Further, the illustrative example can also be employed to provide additional security checks for restricted objects. These checks can provide redundancy to current screenings performed in airports.

Computer system 216 can be configured to perform at least one of the steps, operations, or actions described in the different illustrative examples using software, hardware, firmware, or a combination thereof. As a result, computer system 216 operates as a special purpose computer system in which controller 218 in computer system 216 enables monitoring traffic for a platform. In particular, controller 218 transforms computer system 216 into a special purpose computer system as compared to currently available general computer systems that do not have controller 218.

In the illustrative example, the use of controller 218 in computer system 216 integrates processes into a practical application for monitoring a platform that increases the performance of computer system 216. With the positioning of sensor system 220 to generate sensor information 225 about movement 212 of objects, computer system 216 can more easily determine at least one of count 226 of human beings 204 or count 226 of objects 214 present on platform 202 such as aircraft 206. In particular, controller 218 in computer system 216 can determine count 226 in a manner that does not require full coverage of an interior of an aircraft 206 by cameras or other sensors.

In this illustrative example, controller 218 in computer system 216 is directed to a practical application of processes in controller 218 integrated into computer system 216 that monitors traffic on platform 202 such as aircraft 206. In the illustrative example, controller 218 receives sensor information 225 including images 224 from sensor system 220 positioned to monitor movement 212 of human beings 204 relative to platform 202. Controller 218 identifies a set of human beings 204 in images 224. Controller 218 determines movement 212 of the set of human beings 204 relative to platform 202 using images 224. Further, controller 218 determines count 226 of human beings 204 on platform 202 based on movement 212 determined for the set of human beings 204. Controller 218 performs a set of actions 228 based on count 226 of human beings 204 on platform 202. In this manner, controller 218 in computer system 216 provides a practical application of operations to monitor traffic relative to platform 202 such that count 226 of the number of human beings 204 present on platform 202 can be determined.

The illustration of platform monitoring environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the different examples have been described with respect to monitoring platform 202 in the form of aircraft 206, the different operations performed by controller 218 can be applied to other platforms. For example, platform 202 can also take the form of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, a building, and other suitable types of platforms in addition to aircraft 206 for which monitoring of human beings 204 is desired.

Further, when platform 202 takes other forms other than aircraft 206, sensors 222 can be placed in other locations to monitor for movement 212 of at least one of human beings 204 or objects 214. For example, these other locations can be a hallway, a room, a conference room, a reception area, a foyer, a doorway, a vestibule, or some other location.

As another example, artificial intelligence system 232 can be a component within controller 218 in some illustrative examples. As another example, movement 212 of at least one of human beings 204 or objects 214 can be determined using other types of sensor information 225 in addition to or in place of images 224.

For example, distances in sensor information 225 can be used to determine movement 212. For example, a light detection and ranging (LiDAR) device in sensors 222 can provide distances to objects. A light detection and ranging device (LiDAR) can be used to identify objects such as human beings 204 or objects 214 associated with human beings 204. For example, a laser scanner in sensors 222 can generate measurements in sensor information 225.

Figure 3:
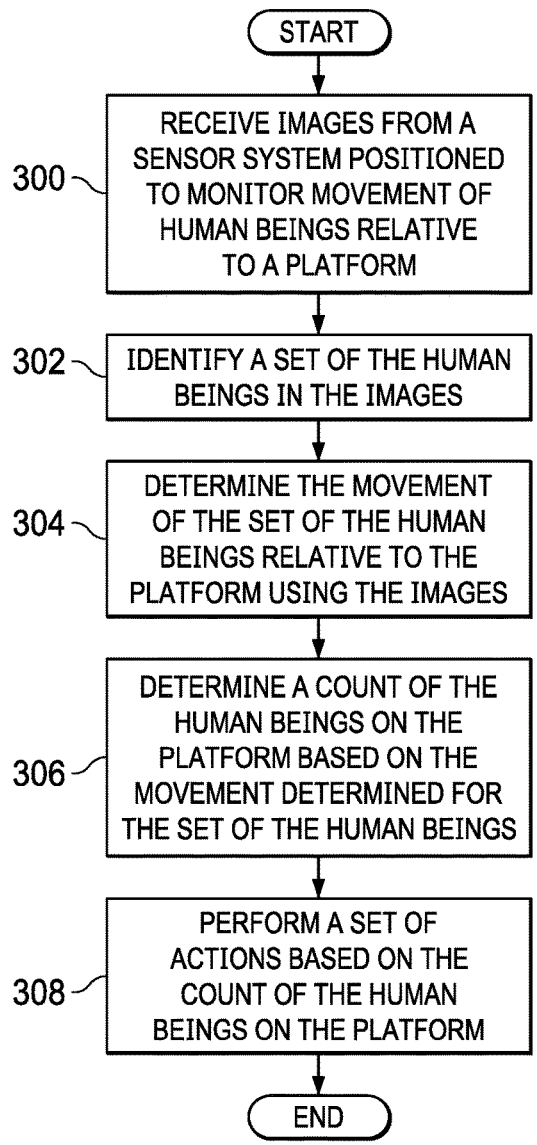
FIG. 3 is an illustration of a flowchart of a process for monitoring a platform in accordance with an illustrative embodiment.

Turning next to FIG. 3, an illustration of a flowchart of a process for monitoring a platform is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2.

The process begins by receiving images from a sensor system positioned to monitor movement of human beings relative to a platform (operation 300). The process identifies a set of the human beings in the images (operation 302).

The process determines the movement of the set of the human beings relative to the platform using the images (operation 304). The process determines a count of the human beings on the platform based on the movement determined for the set of the human beings (operation 306).

The process performs a set of actions based on the count of the human beings on the platform (operation 308). The process terminates thereafter.

The process illustrated in FIG. 3 can be applied to many types of platforms as previously described. Further, the count of the set of the human beings can be determined without having to generate images of every person located on the platform. In other words, the sensor system can be located such that the movement of the human beings on the platform can be determined. This type of positioning can use less sensors as compared to generating images of all human beings on a platform at a particular time.

Figure 4:
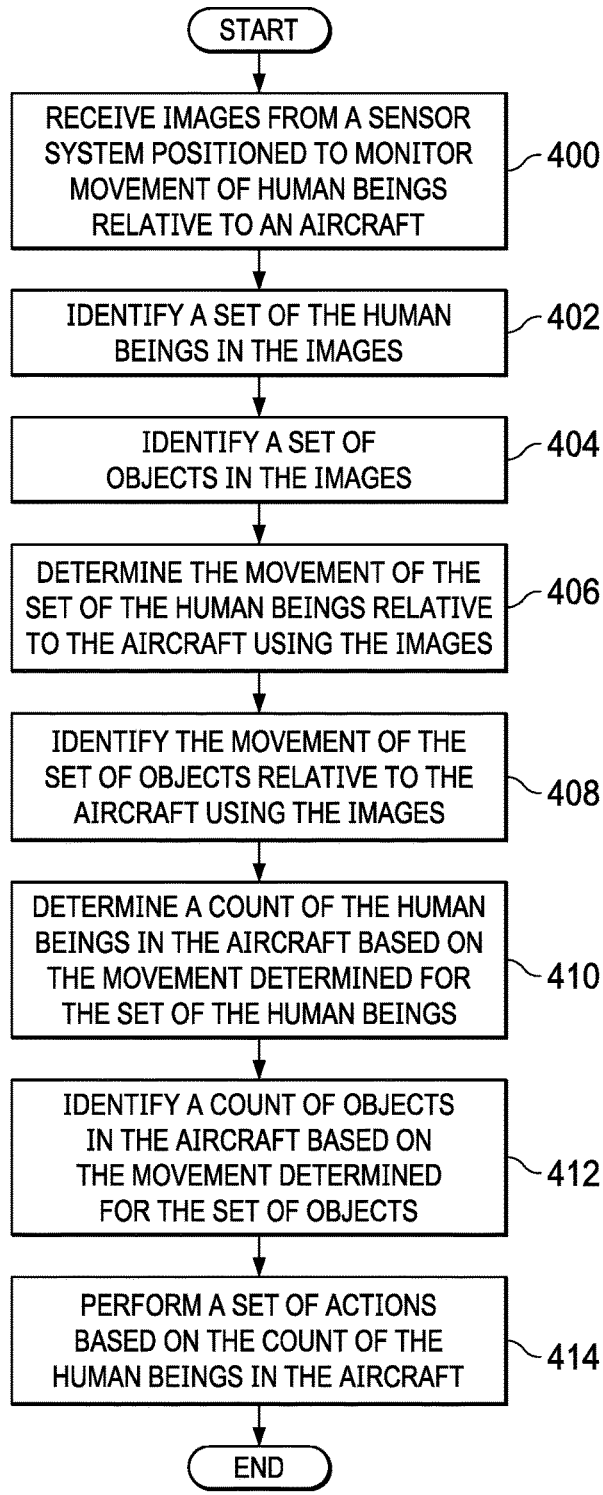
FIG. 4 is an illustration of a flowchart of a process for monitoring traffic for an aircraft in accordance with an illustrative embodiment.

Turning next to FIG. 4, an illustration of a flowchart of a process for monitoring traffic for an aircraft is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2.

The process begins by receiving images from a sensor system positioned to monitor movement of human beings relative to an aircraft (operation 400). The process identifies a set of the human beings in the images (operation 402). The process identifies a set of objects in the images (operation 404). In this illustrative example, the set of objects is identified based on movement of objects. Further, the identification can include identifying associations of the objects with the human beings. In other words, the objects can be identified as being associated with a particular human being if the images showed that the object is being moved by the particular human being.

The process determines the movement of the set of the human beings relative to the aircraft using the images (operation 406). The process identifies the movement of the set of objects relative to the aircraft using the images (operation 408). In operation 406 and operation 408, the determination of the movement can include a direction of the movement of the human beings and objects. This determination can also include determining which human beings enter the aircraft and whether the human beings leave the aircraft.

The process determines a count of the human beings in the aircraft based on the movement determined for the set of the human beings (operation 410). In other words, the process can enable determining which passengers are located in the aircraft.

The process identifies a count of objects in the aircraft based on the movement determined for the set of objects (operation 412). In some illustrative examples, operation 412 can include identifying a type of objects in addition to a presence of objects in the set of objects.

The process performs a set of actions based on the count of the human beings in the aircraft (operation 414). The process terminates thereafter.

This process can be performed any number of times to determine how many human beings and how many objects are present in the aircraft. This process can also be performed to determine how many human beings and how many objects are in other locations near the aircraft, such as in the passenger boarding bridge connected to the aircraft.

Figure 5:
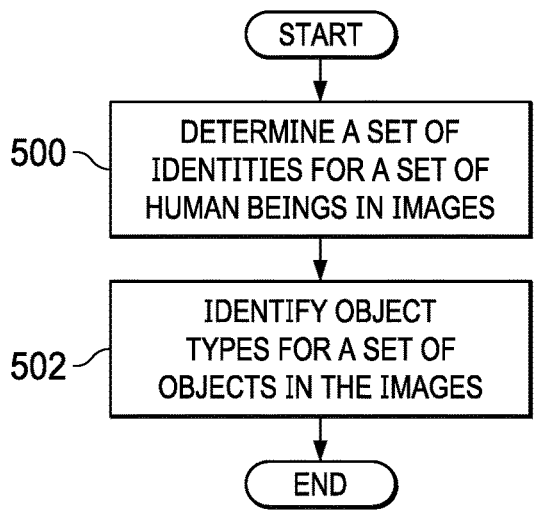
FIG. 5 is an illustration of a flowchart of a process for identifying objects in accordance with an illustrative embodiment.

Turning next to FIG. 5, an illustration of a flowchart of a process for identifying objects is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2. This process can be used with the process illustrated in FIG. 2 to add additional features in monitoring human beings relative to an aircraft.

The process begins by determining a set of identities for a set of human beings in images (operation 500). The process identifies object types for a set of objects in the images (operation 502). The process terminates thereafter.

In this illustrative example, the identification of identities for human beings and object types for objects in FIG. 5 can be performed using at least one of a type of motion identified for the objects in the images, object features, template comparison, or other suitable techniques.

In this illustrative example, machine vision processes, comparisons to images of non-people and objects, machine learning models, and other mechanisms and techniques can be used. In one example, images of human beings who are authorized to be present can be used as a comparison template. These images can be obtained from driver license photos, passport photos, or other sources for authorized human beings. The identities determined can be of passengers, cabin crew, or other authorized personnel. Human beings not matching the images in the comparison template can have identities set as "unauthorized" or "unknown".

As another example, artificial intelligence system 232 in FIG. 2 can include one or more machine learning models that have been trained to recognize people. These machine learning models are trained to recognize human beings generally and to then determine identities for the human beings identified.

With the determination of the identities for the human beings, passengers, cabin crew, maintenance personnel, security, and other people can be identified in traffic moving relative to the aircraft. Further, identification of particular passengers and whether those passengers should be on the aircraft can also be made.

Figure 6:
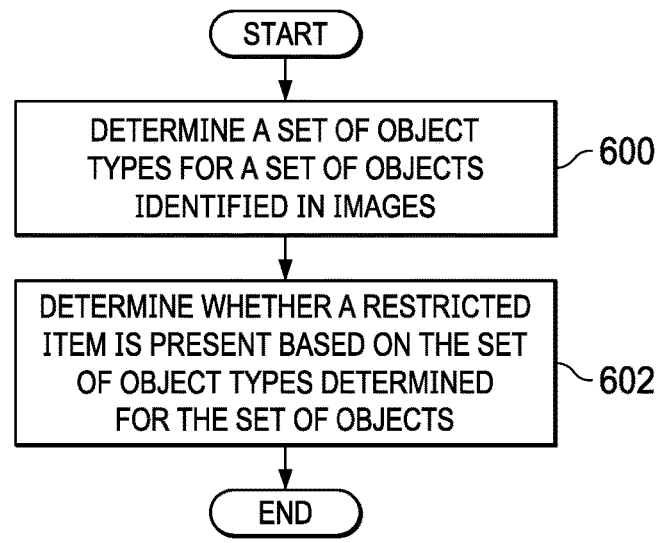
FIG. 6 is an illustration of a flowchart of a process for identifying a restricted item in accordance with an illustrative embodiment.

Turning next to FIG. 6, an illustration of a flowchart of a process for identifying a restricted item is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2. This process can be used with the process illustrated in FIG. 2 to add additional features in monitoring human beings relative to an aircraft.

The process determines a set of object types for a set of objects identified in images (operation 600). In operation 600, the determination can be made using a group of images generated by at least one of a panchromatic camera, a terahertz camera, a millimeter wave scanner, an infrared (IR) camera, or an x-ray system. These types of sensors can be used to generate images of objects within objects, such as a can of hairspray within a bag.

The identification of object types of the set of objects can be performed using various systems such as an artificial intelligence system, a machine learning model, a computer vision system, template matching systems, and other suitable systems that perform object recognition.

The process determines whether a restricted item is present based on the set of object types determined for the set of objects (operation 602). The process terminates thereafter.

In this illustrative example, the operations in FIG. 6 can be performed by controller 218 in FIG. 2 using various object recognition techniques. For example, artificial intelligence system 232 in FIG. 2 can include one or more machine learning models that have been trained to recognize objects such as the items that human beings may carry or move. These machine learning models are trained to recognize whether a particular object is a restricted item.

Figure 7:
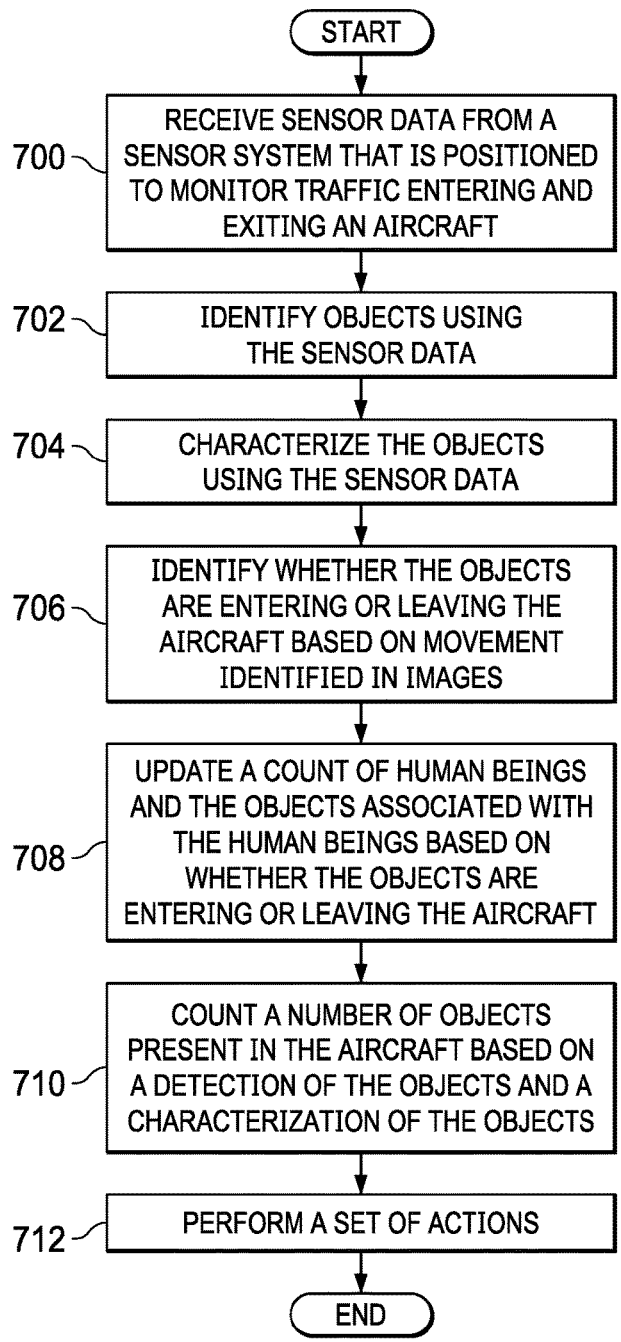
FIG. 7 is an illustration of a flowchart of a more detailed process for monitoring traffic for an aircraft in accordance with an illustrative embodiment.

With reference FIG. 7, an illustration of a flowchart of a more detailed process for monitoring traffic for an aircraft is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2.

The process begins by receiving sensor data from a sensor system that is positioned to monitor traffic entering and exiting an aircraft (operation 700). In this illustrative example, the sensor data received in operation 700 can take a number of forms. For example, images can be received from a visible light camera and an infrared (IR) camera in the sensor system. As another example, distance measurements can be received from a light detection and ranging (LiDAR) device in the sensor system. These distance measurements can be used to determine dimensions of various objects. Further, the sensor system can include measurements of submillimeter radiation set as terahertz waves from a terahertz sensor such as a terahertz camera.

The process identifies objects using the sensor data (operation 702). In operation 702, the objects can be identified in sequential images generated by the visible light camera. As another example, the objects can be identified based on heat measured in the sensor data from an infrared (IR) camera. A measurement of the heat can be used to generate a heat map that is used to detect objects and motion of the objects. As another example, the objects can be detected based on sensor data received from the light detection and ranging (LiDAR) device. The sensor data includes measurements of distance and wavelengths. This information can be used to generate a three-dimensional representation of the objects and track their movement. The objects can also be identified in the sensor data from measurements of terahertz waves detected by a detector sensor. The measurements of the terahertz waves can be used to identify objects within the objects. For example, the terahertz waves can penetrate fabrics and plastics used in the objects to detect a presence of objects within those objects. The measurements of the terahertz waves can be used to generate images of solid objects.

The process then characterizes the objects using the sensor data (operation 704). In operation 704, some or all of the different types of sensor data can be used to characterize an object. For example, motion identified in images from a visible light camera can be used to determine whether the motion type is for a human being. In this manner, the objects can be classified as human beings or non-human objects. As another example, the heat measurements from the infrared (IR) camera can be used to identify a presence of human beings or animals as compared to other object types. As yet another example, the distance measurements from the light detection and ranging (LiDAR) device can be used to characterize the objects based on dimensions measured for the objects. The terahertz measurements can be used to identify objects that may be restricted items hidden within other objects such as luggage.

The process then identifies whether the objects are entering or leaving the aircraft based on movement identified in images (operation 706). In operation 706, a line can be used to determine when an object enters or leaves the aircraft. Depending on a direction of the movement, the object enters or leaves the aircraft when the object crosses the line. This line can be across an entryway such as a doorway for an aircraft door in the aircraft. In this illustrative example, the line is a virtual line used for counting. The virtual line can be based on a line of pixels in an image, a feature, or some other mechanism.

The process updates a count of human beings and the objects associated with the human beings based on whether the objects are entering or leaving the aircraft (operation 708).

The process then counts the number of objects present in the aircraft based on a detection of the objects and a characterization of the objects (operation 710). The process then performs a set of actions (operation 712). For example, in operation 712, for the objects that are not human beings, an action can include determining whether the object is allowable on the aircraft. Another action can be generating an alert if the object is not allowable on the aircraft. For example, the object can be a piece of luggage that has dimensions that are greater than allowed for carry-on luggage. As another example, the object can be a restricted item, such as a can of aerosol hairspray greater than a specified size.

Further, the action can also include determining whether a particular human being is allowed on the aircraft. For example, an identity of human beings on the aircraft can be determined. These identities can then be used to verify that the human beings on the aircraft are allowed on the aircraft. For example, a passenger may mistakenly board the incorrect aircraft even with normal boarding processes at the gate.

Figure 8:
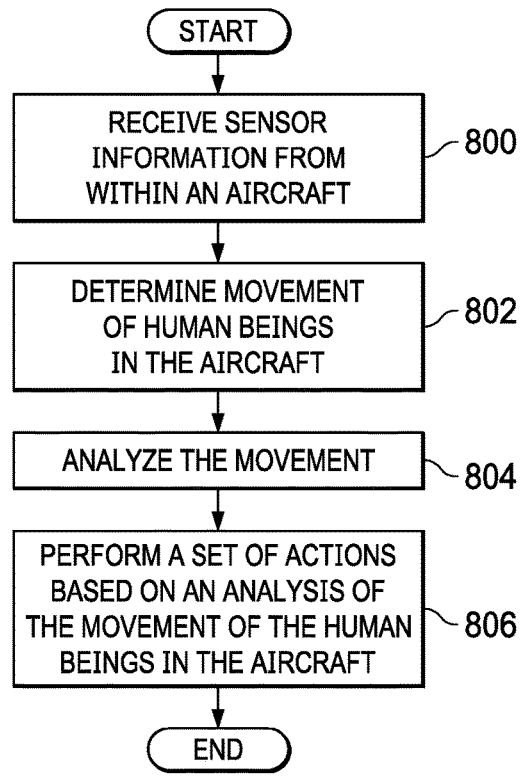
FIG. 8 is another illustration of a flowchart of a more detailed process for monitoring traffic for an aircraft in accordance with an illustrative embodiment.

With reference to FIG. 8, an illustration of a flowchart of a more detailed process for monitoring traffic for an aircraft is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in controller 218 in computer system 216 in FIG. 2. In this illustrative example, the different operations illustrated in this figure can be formed by controller 218 using artificial intelligence system 232 in FIG. 2.

In this illustrative example, sensor information 225 can be generated by sensor system 220 having sensors 222 located inside of aircraft 206, such as in the passenger cabin. Sensors 222 in aircraft 206 can include cameras positioned in the passenger cabin such that movement 212 of passengers, flight crew, or other human beings can be detected. Sensors 222 can also include other types of sensors such as a light detection and ranging (LiDAR) system, terahertz cameras, or other suitable types of sensors.

The process begins by receiving sensor information from within an aircraft (operation 800). In this illustrative example, the sensor information includes images. The images can be generated at a rate such that movement of objects such as passengers, cabin crew, or other human beings can be determined. The process determines movement of human beings in the aircraft (operation 802).

The process analyzes the movement (operation 804). In operation 804, the analysis can determine traffic patterns for different areas of the aircraft. These areas can include an aisle, a galley, an area outside of a lavatory, or other areas in a passenger cabin. As another example, the analysis can identify clusters or locations of passengers or other people in areas of the aircraft. As another illustrative example, the analysis can determine whether a passenger makes a gesture for assistance. This gesture can be made in place of using a call button. Further, the analysis can be used to determine an ability of the passengers to reach overhead bins or other locations in the passenger cabin.

The process performs a set of actions based on an analysis of the movement of the human beings in the aircraft (operation 806). The process terminates thereafter.

The number of actions in operation 806 can take a number of different forms. For example, the analysis from operation 804 can include identifying anomalous movements. The anomalous movements can be, for example, a passenger that has consumed too much alcohol, a passenger that is ill, unruly, or in some other condition or behavior that is not normal or undesired for a flight. With this type of analysis, the process can alert a pilot, a flight attendant, a law enforcement official, or some other person. This alert can also include an identification of the passenger. The identification can include a photo or an image of the passenger for which an anomalous movement has been detected.

As another example, the analysis of the traffic in operation 804 may indicate that too many human beings are in front of a lavatory or near a flight deck door based on airline rules, federal regulations, or other rules. This result can be used to generate an alert to notify a flight attendant or cabin crew of the situation.

In another illustrative example, the analysis may indicate that a passenger is requesting assistance from a flight attendant. In this case, the action in operation 806 can alert a flight attendant that a particular passenger has requested assistance.

As another illustrative example, when the analysis identifies the ability of passengers to reach overhead bins and place luggage in overhead bins, the action can include alerting flight attendants of passengers that may require assistance with their luggage. As a result, the process can anticipate when the passengers may need assistance with retrieving the luggage from the overhead bins when a flight has ended. These and other actions can be performed based on analysis performed by movements of passengers and other human beings within an aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the processes directed towards monitoring objects for aircraft described in some of the different flowcharts can be applied to other types of platforms other than aircraft. For example, the processes can be applied to tracking movement of objects for a building, a train, a bus, a stadium, or some other suitable type of platform.

Figure 9:
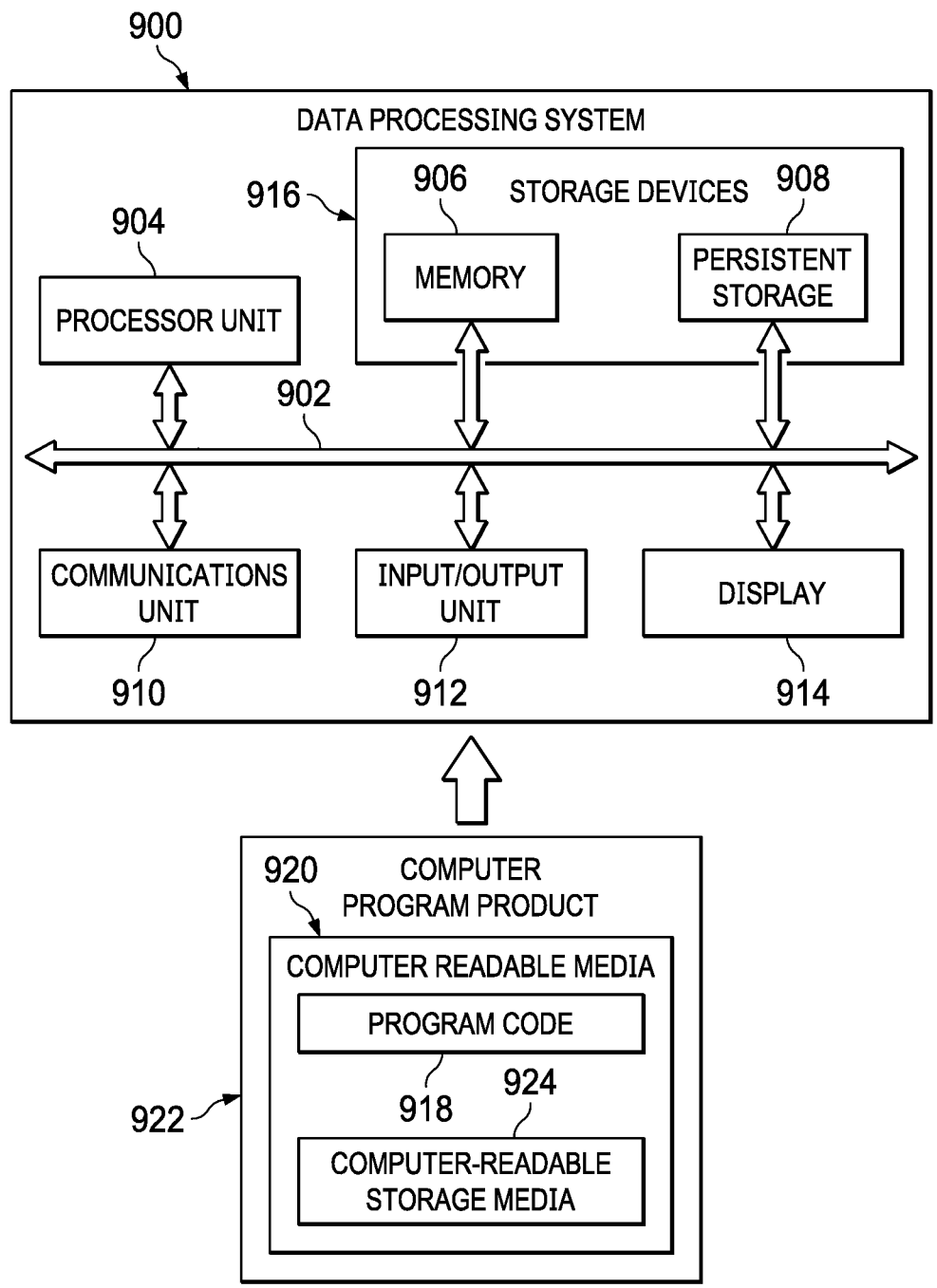
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 can be used to implement server computer 104, server computer 106, client devices 110, in FIG. 1. Data processing system 900 can also be used to implement computer system 216 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multiprocessor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 can take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 can provide a connection for user input through at least one of a keyboard, a mouse, or some other suitable input device. Further, input/output unit 912 can send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which can be located in a memory, such as memory 906.

These instructions are referred to as program code, computer usable program code, or computer-readable program code that can be read and executed by a processor in processor unit 904. In the illustrative example, these instructions can be executed to cause one or more processors in processor unit 904 to perform operations it is described in the flowcharts that are embodied in component such as controller 218 in FIG. 2. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, can be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, the illustrative examples provide a method, apparatus, system, and computer program product for monitoring traffic for a platform. In one illustrative example, a method monitors a platform such as an aircraft. Images are received by a computer system from a sensor system positioned to monitor movement of human beings relative to the aircraft. A set of the human beings is identified by the computer system in the images. The movement of the set of the human beings relative to the platform is determined by the computer system using the images. A count of the human beings on the aircraft is determined by the computer system based on the movement determined for the set of the human beings. A set of actions is performed by the computer system based on the count of the human beings on the platform.

In this manner, the platform monitoring system, such as an aircraft monitoring system for an aircraft, can operate to determine a number of passengers and carry-on luggage that is present in an aircraft. In the illustrative examples, the movement of objects such as passengers and luggage can be monitored to determine the entry and exit of these objects with respect to an aircraft. The entries and exits can be used to determine a count of the passengers and the luggage or other objects at least one of more quickly or more accurately as compared to current techniques in which airline or other personnel count the passengers and the luggage.

Further, the illustrative examples can also provide features in which restricted items can be identified. This identification of the restricted items can be performed in addition to the current screenings performed at various locations in an airport.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring traffic for an aircraft, the method comprising:
   receiving, by a computer system, images from a sensor system positioned to monitor movement of human beings relative to the aircraft;
   identifying, by the computer system, a set of the human beings in the images;
   determining, by the computer system, the movement of the set of the human beings relative to the aircraft using the images;
   determining, by the computer system, a count of the human beings in the aircraft based on the movement determined for the set of the human beings; and
   performing, by the computer system, a set of actions based on the count of the human beings in the aircraft, wherein the set of actions comprises determining an identity of a particular human being in the set of human beings identified in the images, wherein the particular human is identified as a passenger,
   wherein the set of actions further comprises
      indicating that the passenger should disembark the aircraft.

2. The method of claim 1 further comprising:
   identifying, by the computer system, a set of objects associated with the set of the human beings using the images.

3. The method of claim 2 further comprising:
determining, by the computer system, a count of the set of objects in the aircraft based on the movement determined for the set of objects.

4. The method of claim 3, wherein performing, by the computer system, the set of actions based on the movement determined for the set of the human beings comprises:
performing, by the computer system, the set of actions based on the movement determined for at least one of the set of the human beings or the set of objects.

5. The method of claim 3, wherein determining, by the computer system, how many of the objects are in the aircraft based on the movement determined for the set of objects comprises:
determining, by the computer system, how many of the objects are in the aircraft based on the movement determined for the set of objects after at least one of boarding the aircraft, deplaning the aircraft, closing an aircraft door after deplaning, leaving a departure gate, performing a partial deboarding of the aircraft, taking off, or landing.

6. The method of claim 2 further comprising:
determining, by the computer system, whether a restricted item is present in the set of objects.

7. The method of claim 6, wherein determining, by the computer system, whether the restricted item is present in the set of objects comprises:
analyzing, by the computer system, a group of the images generated by at least one of a panchromatic camera, a terahertz camera, a millimeter wave scanner, an infrared (IR) camera, or an x-ray system.

8. The method of claim 2, wherein the set of objects is selected from at least one of a piece of luggage, a backpack, a rolling suitcase, a bag, a box, a bottle, a purse, a suitcase, a duffel bag, a wallet, a belt, or an animal.

9. The method of claim 1 further comprising:
determining, by the computer system, a set of identities for the set of the human beings in the images based at least on one of a type of motion identified for objects in the images, object features, or template comparison.

10. The method of claim 1, wherein identifying, by the computer system, the set of the human beings in the images comprises:
identifying, by the computer system, the set of the human beings in the images using an artificial intelligence system.

11. The method of claim 1, wherein identifying, by the computer system, the set of the human beings in the images comprises:
identifying a number of passengers from the set of the human beings.

12. The method of claim 1, wherein identifying, by the computer system, the set of the human beings in the images comprises:
determining a set of identities for the set of the human beings.

13. The method of claim 1, wherein determining, by the computer system, the count of the human beings in the aircraft based on the movement determined for the set of the human beings comprises:
determining, by the computer system, how many of the human beings are in the aircraft based on the movement determined for the set of the human beings after at least one of boarding the aircraft, deplaning the aircraft, closing an aircraft door after deplaning, leaving a departure gate, performing a partial deboarding of the aircraft, taking off, or landing.

14. The method of claim 1, wherein the sensor system comprises sensors located in at least one of a passenger cabin, an aircraft doorway, a bulkhead, a sidewall of the aircraft, a jetway, a floor of the aircraft, a galley, a lavatory, a passenger comfort unit, a passenger boarding bridge doorway, a cargo hold, a gate at an airport, a jet bridge, or a passenger boarding bridge.

15. The method of claim 1, wherein the set of actions further comprises at least one of:
sending a message,
generating an alert,
creating a log entry with the set of the human beings,
indicating ready for departure,
indicating not ready for departure,
indicating presence of an object left behind by the particular human being,
indicating the particular human being present on the aircraft as a passenger is inconsistent with a passenger log for the aircraft,
indicating presence of an unidentified object on the aircraft,
determining whether the particular human being is restricted from flying on the aircraft,
indicating presence of an animal in the aircraft,
indicating when a number of pieces of luggage exceed a storage capacity of an overhead bin and under-seat storage in a passenger cabin,
alerting a pilot,
alerting a flight attendant,
alerting a gate attendant,
preventing an aircraft engine start,
preventing closing of an aircraft door for the aircraft,
indicating the object left behind in a cargo hold by aircraft personnel,
indicating the passenger should have boarded the aircraft but has not boarded the aircraft,
indicating the passenger should have boarded the aircraft and has boarded the aircraft, or
performing a cross-check of passenger count during an emergency egress of the aircraft.

16. The method of claim 1, wherein the sensor system comprises at least of a visible light camera, an infrared sensor (IR), a panchromatic camera, a terahertz camera, an x-ray system, a thermal infrared (IR) sensor, or a light detection and ranging (LiDAR) system.

17. A method for monitoring a platform associated with an aircraft, the method comprising:
receiving, by a computer system, images from a sensor system positioned to monitor movement of human beings relative to the platform;
identifying, by the computer system, a set of the human beings in the images;
determining, by the computer system, the movement of the set of the human beings relative to the platform using the images;
determining, by the computer system, a count of the human beings on the platform based on the movement determined for the set of the human beings; and
performing, by the computer system, a set of actions based on the count of the human beings on the platform, wherein the set of actions comprises determining an identity of a particular human being in the set of human beings identified in the images, wherein the particular human is identified as a passenger,
wherein the set of actions further comprises at least one of:

indicating presence of the passenger in the aircraft is inconsistent with a passenger log for the aircraft, or determining whether the passenger is restricted from flying on the aircraft.

18. The method of claim 17 further comprising:
identifying, by the computer system, a set of objects associated with the set of the human beings using the images.

19. The method of claim 18 further comprising:
determining, by the computer system, a count of the set of objects on the platform based on the movement determined for the set of objects.

20. The method of claim 19, wherein performing, by the computer system, the set of actions based on the movement determined for the set of the human beings comprises:
performing, by the computer system, the set of actions based on the movement determined for at least one of the set of the human beings or set of objects.

21. The method of claim 18 further comprising:
determining, by the computer system, whether a restricted item is present in the set of objects.

22. The method of claim 21, wherein determining, by the computer system, whether the restricted item is present in the set of objects comprises:
analyzing, by the computer system, a group of the images generated by at least one of a panchromatic camera, a terahertz camera, a millimeter wave scanner, an infrared camera, or an x-ray system.

23. The method of claim 17, wherein the platform is selected from a group comprising a mobile platform, a stationary platform, a land-based structure, an aquatic-based structure, a space-based structure, an aircraft, an airplane, a commercial aircraft, commercial airplane, a rotorcraft, a tilt-rotor aircraft, a tilt-wing aircraft, a vertical takeoff and landing aircraft, a surface ship, a tank, a personnel carrier, a train, a spacecraft, a space station, a satellite, a submarine, an automobile, a power plant, a bridge, a dam, a house, a manufacturing facility, and a building.

24. An aircraft monitoring system comprising:
a computer system; and
a controller in the computer system, wherein the controller is configured to:
receive images from a sensor system positioned to monitor movement of human beings relative to an aircraft;
identify a set of the human beings in the images;
determine the movement of the set of the human beings relative to the aircraft using the images;
determine a count of the human beings in the aircraft based on the movement determined for the set of the human beings; and
perform a set of actions based on the count of the human beings in the aircraft, wherein the set of actions comprises determining an identity of a particular human being in the set of human beings identified in the images, wherein the particular human is identified as a passenger, wherein the set of actions further comprises indicating that the passenger should disembark the aircraft.

25. The aircraft monitoring system of claim 24 further comprising:
identifying, by the computer system, a set of objects associated with the set of the human beings using the images.

26. The aircraft monitoring system of claim 25 further comprising:

determining, by the computer system, a count of the set of objects in the aircraft based on the movement determined for the set of objects.

27. The aircraft monitoring system of claim 26, wherein performing, by the computer system, the set of actions based on the movement determined for the set of the human beings comprises:
performing, by the computer system, the set of actions based on the movement determined for at least one of the set of the human beings or the set of objects.

28. The aircraft monitoring system of claim 26, wherein determining, by the computer system, how many of the objects are in the aircraft based on the movement determined for the set of objects comprises:
determining, by the computer system, how many of the objects are in the aircraft based on the movement determined for the set of objects after at least one of boarding the aircraft, deplaning the aircraft, closing an aircraft door after deplaning, leaving a departure gate, performing a partial deboarding of the aircraft, taking off, or landing.

29. The aircraft monitoring system of claim 25 further comprising:
determining, by the computer system, whether a restricted item is present in the set of objects.

30. The aircraft monitoring system of claim 29, wherein determining, by the computer system, whether the restricted item is present in the set of objects comprises:
analyzing, by the computer system, a group of the images generated by at least one of a panchromatic camera, a terahertz camera, a millimeter wave scanner, an infrared (IR) camera, or an x-ray system.

31. The aircraft monitoring system of claim 25, wherein the set of objects is selected from at least one of a piece of luggage, a backpack, a rolling suitcase, a bag, a box, a bottle, a purse, a suitcase, a duffel bag, a wallet, a belt, or an animal.

32. The aircraft monitoring system of claim 24 further comprising:
determining, by the computer system, a set of identities for the set of the human beings in the images based at least on one of a type of motion identified for objects in the images, object features, or template comparison.

33. The aircraft monitoring system of claim 24, wherein identifying, by the computer system, the set of the human beings in the images comprises:
identifying, by the computer system, the set of the human beings in the images using an artificial intelligence system.

34. The aircraft monitoring system of claim 24, wherein identifying, by the computer system, the set of the human beings in the images comprises:
identifying a number of passengers from the set of the human beings.

35. The aircraft monitoring system of claim 24, wherein identifying, by the computer system, the set of the human beings in the images comprises:
determining a set of identities for the of the human beings.

36. The aircraft monitoring system of claim 24, wherein determining, by the computer system, the count of the human beings in the aircraft based on the movement determined for the set of the human beings comprises:
determining, by the computer system, the count of the human beings in the aircraft based on the movement determined for the set of the human beings after at least one of boarding the aircraft, deplaning the aircraft, closing an aircraft door after deplaning, leaving a departure gate, performing a partial deboarding of the aircraft, taking off, or landing.

37. The aircraft monitoring system of claim 24, wherein the sensor system comprises sensors located in at least one of a passenger cabin, an aircraft doorway, a bulkhead, a sidewall of the aircraft, a jetway, a floor of the aircraft, a galley, a lavatory, a passenger comfort unit, a passenger boarding bridge doorway, a gate at an airport, a jet bridge, or a passenger boarding bridge.

38. The aircraft monitoring system of claim 24, wherein the set of actions further comprises at least one of:
sending a message,
generating an alert,
creating a log entry with the set of the human beings,
indicating ready for departure,
indicating not ready for departure,
indicating a missing passenger,
indicating a presence of the particular human being as a passenger in the aircraft,
indicating presence of an object left behind by the particular human being,
indicating the particular human being present on the aircraft as a passenger is inconsistent with a passenger log for the aircraft,
indicating presence of an unidentified object on the aircraft,
determining whether the particular human being is restricted from flying on the aircraft,
indicating presence of an animal in the aircraft,
indicating when a number of pieces of luggage exceed a storage capacity of an overhead bin and under-seat storage in a passenger cabin,
alerting a pilot,
alerting a flight attendant,
alerting a gate attendant,
preventing an aircraft engine start,
preventing closing of an aircraft door for the aircraft,
indicating the object left behind in a cargo hold by aircraft personnel, or
performing a cross-check of a passenger count during an emergency egress of the aircraft.

39. The aircraft monitoring system of claim 24, wherein the sensor system comprises at least one of a visible light camera, an infrared (IR) sensor, a panchromatic camera, a terahertz camera, an x-ray system, a thermal infrared (IR) sensor, or a light detection and ranging (LiDAR) system.

40. A system for monitoring a platform associated with an aircraft, the system comprising:
a computer system; and
a controller in the computer system, wherein the controller is configured to:
receive images from a sensor system positioned to monitor movement of human beings relative to the platform;
identify a set of the human beings in the images;
determine the movement of the set of the human beings relative to the platform using the images;
determine a count of the human beings on the platform based on the movement determined for the set of the human beings; and
perform a set of actions based on the count of the human beings on the platform, wherein the set of actions comprises determining an identity of a particular human being in the set of human beings identified in the images, wherein the particular human is identified as a passenger,
wherein the set of actions further comprises at least one of:
indicating the passenger should have boarded the aircraft but has not boarded the aircraft,
indicating the passenger should have boarded the aircraft and has boarded the aircraft,
indicating presence of the passenger in the aircraft is inconsistent with a passenger log for the aircraft, or
determining whether the passenger is restricted from flying on the aircraft.

41. The system of claim 40 further comprising:
identifying, by the computer system, a set of objects associated with the set of the human beings using the images.

42. The system of claim 41 further comprising:
determining, by the computer system, a count of the set of objects on the platform based on the movement determined for the set of objects.

43. The system of claim 42, wherein performing, by the computer system, the set of actions based on the movement determined for the set of the human beings comprises:
performing, by the computer system, the set of actions based on the movement determined for at least one of the set of the human beings or the set of objects.

44. The system of claim 41 further comprising:
determining, by the computer system, whether a restricted item is present in the set of objects.

45. The system of claim 44, wherein determining, by the computer system, whether the restricted item is present in the set of objects comprises:
analyzing, by the computer system, a group of the images generated by at least one of a panchromatic camera, a terahertz camera, a millimeter wave scanner, an infrared (IR) camera, or an x-ray system.

46. The system of claim 40, wherein the platform is selected from a group comprising a mobile platform, a stationary platform, a land-based structure, an aquatic-based structure, a space-based structure, an aircraft, an airplane, a commercial aircraft, commercial airplane, a rotorcraft, a tilt-rotor aircraft, a tilt-wing aircraft, a vertical takeoff and landing aircraft, a surface ship, a tank, a personnel carrier, a train, a spacecraft, a space station, a satellite, a submarine, an automobile, a power plant, a bridge, a dam, a house, a manufacturing facility, and a building.

47. A computer program product for monitoring an aircraft, the computer program product comprising:
a computer-readable storage media;
program code, stored on the computer-readable storage media, executable by a computer system to cause the computer system to:
receive images from a sensor system positioned to monitor movement of human beings relative to the aircraft;
identify a set of the human beings in the images;
determine the movement of the set of the human beings relative to the aircraft using the images;
determine a count of the human beings in the aircraft based on the movement determined for the set of the human beings;
determine that a particular human identified in the images is a passenger presently boarded on the aircraft; and,
indicate that the passenger should disembark the aircraft.

* * * * *